United States Patent [19]
Gilbert

[11] Patent Number: 5,906,133
[45] Date of Patent: May 25, 1999

[54] LASH ADJUSTMENT ASSEMBLY

[75] Inventor: Wendell L. Gilbert, Pleasant Shade, Tenn.

[73] Assignee: TRW Inc., Lyndhurst, Ohio

[21] Appl. No.: 08/988,325

[22] Filed: Dec. 10, 1997

[51] Int. Cl.⁶ .............................. F16H 55/18; B62D 3/12
[52] U.S. Cl. ................................ 74/409; 74/498; 74/398; 74/422
[58] Field of Search .......................... 74/498, 409, 398, 74/422, 402; 188/196 BA

[56] References Cited

U.S. PATENT DOCUMENTS

| | | | |
|---|---|---|---|
| 3,060,762 | 10/1962 | Lutz | 74/409 |
| 3,186,249 | 6/1965 | Lanzenberger | 74/409 |
| 3,884,091 | 5/1975 | Hay. | |
| 3,942,827 | 3/1976 | Warlop et al. | 188/196 BA |
| 4,180,146 | 12/1979 | Airheart | 188/196 BA |
| 4,294,159 | 10/1981 | Wendler et al. | 74/409 |
| 5,341,701 | 8/1994 | Krom et al. | |

*Primary Examiner*—John A. Jeffery
*Assistant Examiner*—William C. Joyce
*Attorney, Agent, or Firm*—Tarolli, Sundheim, Covell, Tummino & Szabo

[57] ABSTRACT

A vehicle steering apparatus (10) includes a first gear (16) which is rotatable about an axis (21), and a second gear (14) having gear teeth (18) in meshing engagement with gear teeth (20) on the first gear (16). The apparatus further comprises an adjustment mechanism (22) for moving the first gear (16) in one direction along the axis (21) to reduce clearance between the meshing gear teeth (18, 20). The adjustment mechanism (22) includes a first threaded member (64), a second threaded member (90) and a ratchet drive (98). The first threaded member (64) is movable along the axis (21) in the one direction to move the first gear (16) along the axis in that direction. The second threaded member (90) is screwed together with the first threaded member (64) such that rotation of the second threaded member (90) causes axial movement of the first threaded member (64). The ratchet drive (98) is interposed between the first gear (16) and the second threaded member (90), and rotates the second threaded member (90) selectively when lash between the meshing gear teeth (18, 20) provides the clearance.

8 Claims, 3 Drawing Sheets

LASH ADJUSTMENT ASSEMBLY

BACKGROUND OF THE INVENTION

The present invention relates to a lash adjustment assembly which is effective to reduce clearance between teeth of gears in a vehicle steering apparatus.

A known lash adjustment assembly is disclosed in U.S. Pat. No. 3,884,091. U.S. Pat. No. 3,884,091 discloses an adjustment assembly for moving a first gear along a first axis to reduce clearance between teeth of the first gear and a second gear. A shaft extension of the first gear rotatably supports a pair of cams. The cams are fixed together to provide cam slots. The cam slots are engaged by cam elements of a support cam non-rotatably fixed to a housing. The cams are rotatably biased in an up ramp direction relative to the support cam by a spring to effect axial adjustment of the first gear. A cam locking device is connected to the cams to permit axial adjustment only when the steering gear is centered and to prevent axial adjustment during turning of the steering gear in either direction from the centered position.

SUMMARY OF THE INVENTION

In accordance with the present invention, a vehicle steering apparatus comprises a first gear which is rotatable about an axis, and a second gear having gear teeth in meshing engagement with gear teeth on the first gear. The apparatus further comprises adjustment means for moving the first gear in one direction along the axis to reduce clearance between the meshing gear teeth. The adjustment means includes a first threaded member, a second threaded member and a ratchet drive.

The first threaded member is movable along the axis in the one direction to move the first gear along the axis in that direction. The second threaded member is screwed together with the first threaded member such that rotation of the second threaded member causes axial movement of the first threaded member. The ratchet drive is interposed between the first gear and the second threaded member, and rotates the second threaded member selectively when lash between the meshing gear teeth provides the clearance.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF A PREFERRED EMBODIMENT

Figure 1:
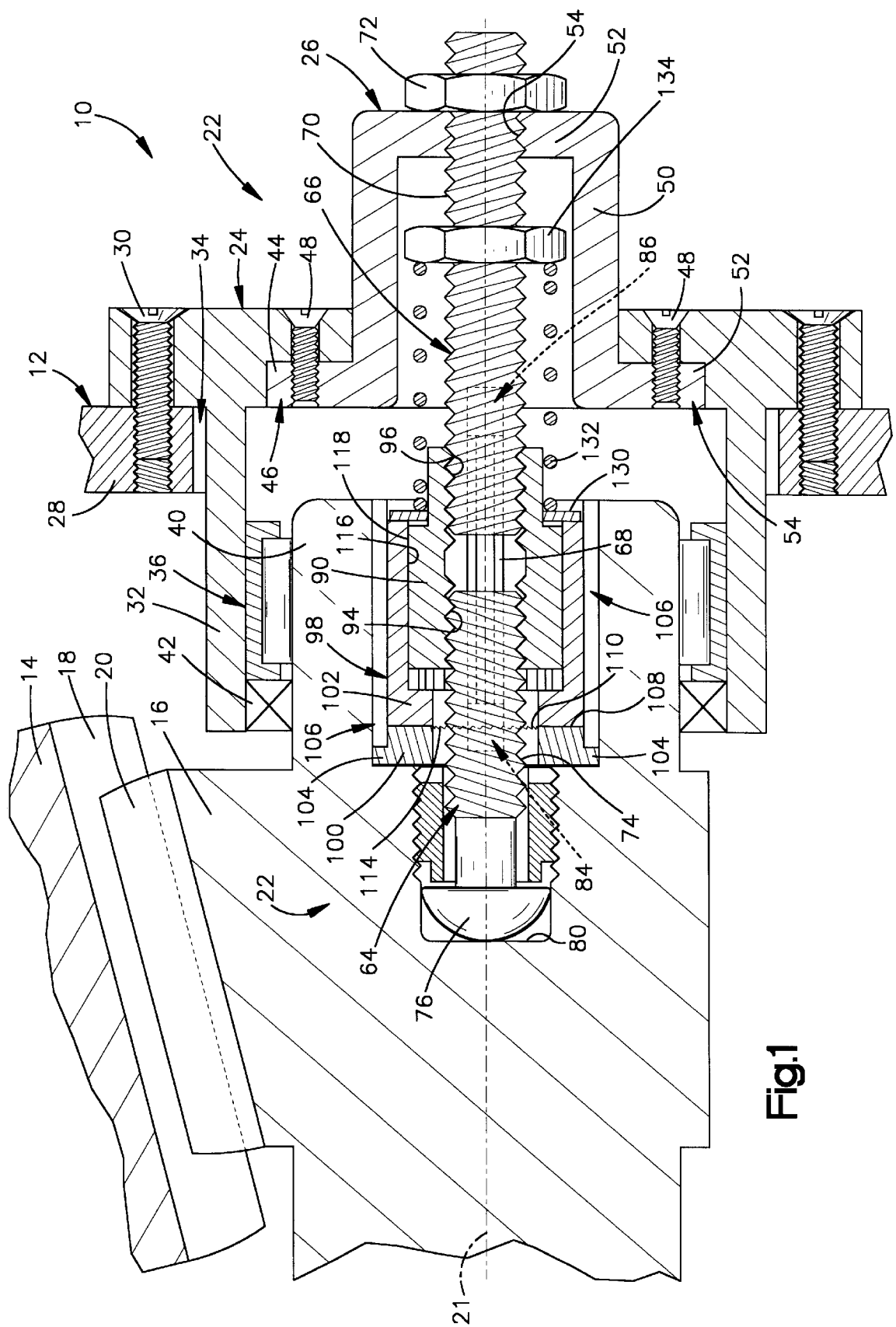
FIG. 1 is a sectional view of an apparatus comprising a preferred embodiment of the present invention.

A vehicle steering apparatus 10 comprising a preferred embodiment of the present invention is shown partially in FIG. 1. The apparatus 10 includes a housing 12 containing a rack gear 14 and a sector gear 16. Rack teeth 18 on the rack gear 14 mesh with sector teeth 20 on the sector gear 16. The rack gear 14 is connected with a piston in a hydraulic fluid power steering motor (not shown), and is movable with the piston in a known manner. The sector gear 16 is supported for rotation about an axis 21, and is connected with a Pitman arm (not shown) in a vehicle steering linkage. When the rack gear 14 moves, it rotates the sector gear 16 which, in turn, moves the Pitman arm to actuate the steering linkage. Lash can develop as a result of wear between the meshing teeth 18 and 20 on the rack gear 14 and the sector gear 16. In accordance with the present invention, an adjustment mechanism 22 acts between the housing 12 and the gears 14 and 16 to take up lash between the meshing teeth 18 and 20.

The housing 12 includes a pair of cover parts 24 and 26. The first cover part 24 is fixed to an outer wall 28 of the housing 12 by fasteners 30. A cylindrical portion 32 of the first cover part 24 is centered on the axis 21, and projects axially inward (from right to left as viewed in FIG. 1) through an opening 34 in the outer wall 28.

A roller bearing assembly 36 engages a cylindrical end portion 40 of the sector gear 16 within the cylindrical portion 32 of the first cover part 24. The roller bearing assembly 36 supports the sector gear 16 for rotation about the axis 21. An annular seal 42 (shown schematically) engages the end portion 40 of the sector gear 16 beside the roller bearing assembly 36. The seal 42, as well as the roller bearing assembly 36, may comprise any suitable structure known in the art.

The second cover part 26 is a cup-shaped structure which serves as a base for the adjustment mechanism 22. An annular rim portion 44 of the second cover part 26 is received within a countersunk opening 46 in the first cover part 24, and is fixed to the first cover part 24 by screws 48. A cylindrical portion 50 of the second cover part 26 projects axially outward from the rim 44 through the opening 46. A circular end wall 52 defines the outer end of the second cover part 26. The end wall 52 includes a surface that defines a central opening in the end wall 52 and that has an internal screw thread 54 centered on the axis 21.

The adjustment mechanism 22 has a plurality of elongated parts that extend along the axis 21. These include a first adjustment screw 64, a second adjustment screw 66, and a hex shaft 68. The second adjustment screw 66 extends through the end wall 52, and has a screw thread 70 engaged with the internal screw thread 54 on the end wall 52. A jam nut 72 fastens the second adjustment screw 66 immovably to the end wall 52. The first adjustment screw 64 is spaced axially from the second adjustment screw 66, and has a screw thread 74 extending oppositely to the thread 70 on the second adjustment screw 66. A generally spherical head 76 on the first adjustment screw 64 abuts a planar inner surface 80 of the sector gear 16.

The hex shaft 68 extends longitudinally between the first and second adjustment screws 64 and 66. Specifically, the hex shaft 68 extends oppositely into an opposed pair of hex-shaped bores 84 and 86 in the first and second adjustment screws 64 and 66, respectively. In this arrangement, the first adjustment screw 64 can move along the axis 21 by sliding over the hex shaft 68, but is blocked by the hex shaft 68 from rotating about the axis 21.

A coupling sleeve 90 extends partially over the two adjustment screws 64 and 66. A first internal screw thread 94 on the coupling sleeve 90 engages the screw thread 74 on the first adjustment screw 64. A second, oppositely extending internal screw thread 96 on the coupling sleeve 90 engages the screw thread 70 on the second adjustment screw 66.

Since the second adjustment screw 66 is fixed to the end wall 52, rotation of the coupling sleeve 90 cannot affect the position of the second adjustment screw 66. However, when the coupling sleeve 90 rotates about the axis 21, it moves the first adjustment screw 64 along the axis 21.

The adjustment mechanism 22 takes up lash between the meshing gear teeth 18 and 20 by moving the sector gear 16 relative to the rack gear 14 in a direction extending from right to left along the axis 21, as viewed in FIG. 1. If there is enough lash to provide clearance for such movement of the sector gear 16, the adjustment mechanism 22 will move the first adjustment screw 64 forcefully against the sector gear 16 to push the sector gear 16 to the left. This is accomplished by rotating the coupling sleeve 90 about the axis 21 such that the coupling sleeve 90 moves the first adjustment screw 64 axially to the left. A ratchet drive portion 98 of the adjustment mechanism 22 rotates the coupling sleeve 90 selectively upon rotation of the sector gear 16 so as to take up lash in this manner.

The ratchet drive 98 includes a ratchet ring 100 and a ratchet sleeve 102. The ratchet ring 100 has a pair of diametrically opposed keys 104 projecting radially outward into a pair of diametrically opposed slots 106 in the sector gear 16. Each key 104 is received in the corresponding slot 106 in an interference fit such that the ratchet ring 100 cannot move relative to the sector gear 16.

The ratchet ring 100 further has an annular face 108 with a circumferentially extending array of ratchet teeth 110. An opposed array of ratchet teeth 114 on the ratchet sleeve 102 mesh with the teeth 110 on the ratchet ring 100. A splined inner surface 116 of the ratchet sleeve 102 extends over a splined outer surface 118 of the coupling sleeve 90. Accordingly, the ratchet sleeve 102 and the coupling sleeve 90 are movable axially relative to each other, but are constrained to rotate together.

Other parts of the ratchet drive 98 include a thrust washer 130 and a preload spring 132. The preload spring 132 is compressed axially between the thrust washer 130 and a nut 134 on the second adjustment screw 66. The thrust washer 130 abuts the outer end of the ratchet sleeve 102, and transmits an axially directed preloading force from the spring 132 to the ratchet sleeve 102. The preloading force urges the teeth 114 at the inner end of the ratchet sleeve 102 into meshing engagement with the teeth 110 on the ratchet ring 100.

Figure 2:
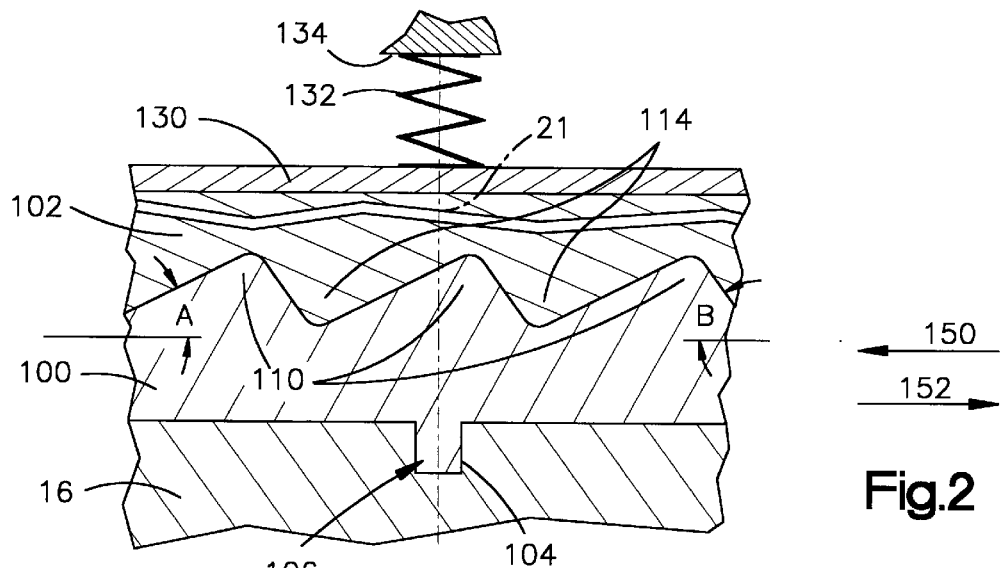
FIG. 2 is a schematic view of parts shown in FIG. 1.

When the sector gear 16 rotates about the axis 21, it moves back and forth in directions indicated by the arrows shown in the schematic view of FIG. 2. The sector gear 16 thus rotates in a freewheel direction 150, and oppositely in an adjustment direction 152. When the sector gear 16 rotates in the freewheel direction 150, the teeth 110 on the ratchet ring 100 press against the teeth 114 on the ratchet sleeve 102 in the freewheel direction 150. The teeth 110 then interact with the teeth 114 at the angle A shown in FIG. 2.

Figure 3:
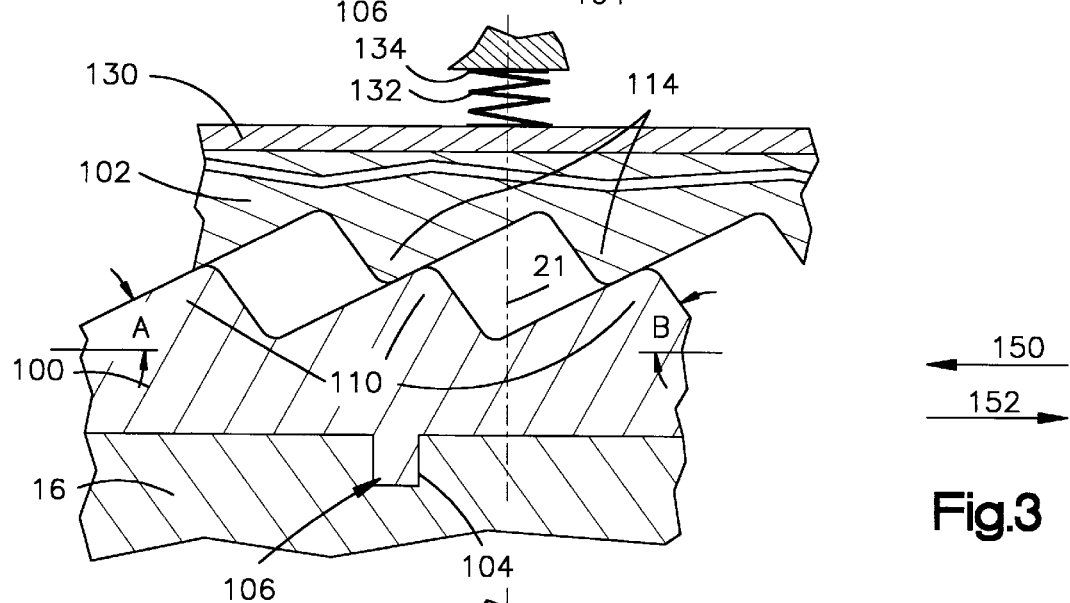
FIG. 3 is a schematic view similar to FIG. 2 showing parts in different positions.
Figure 4:
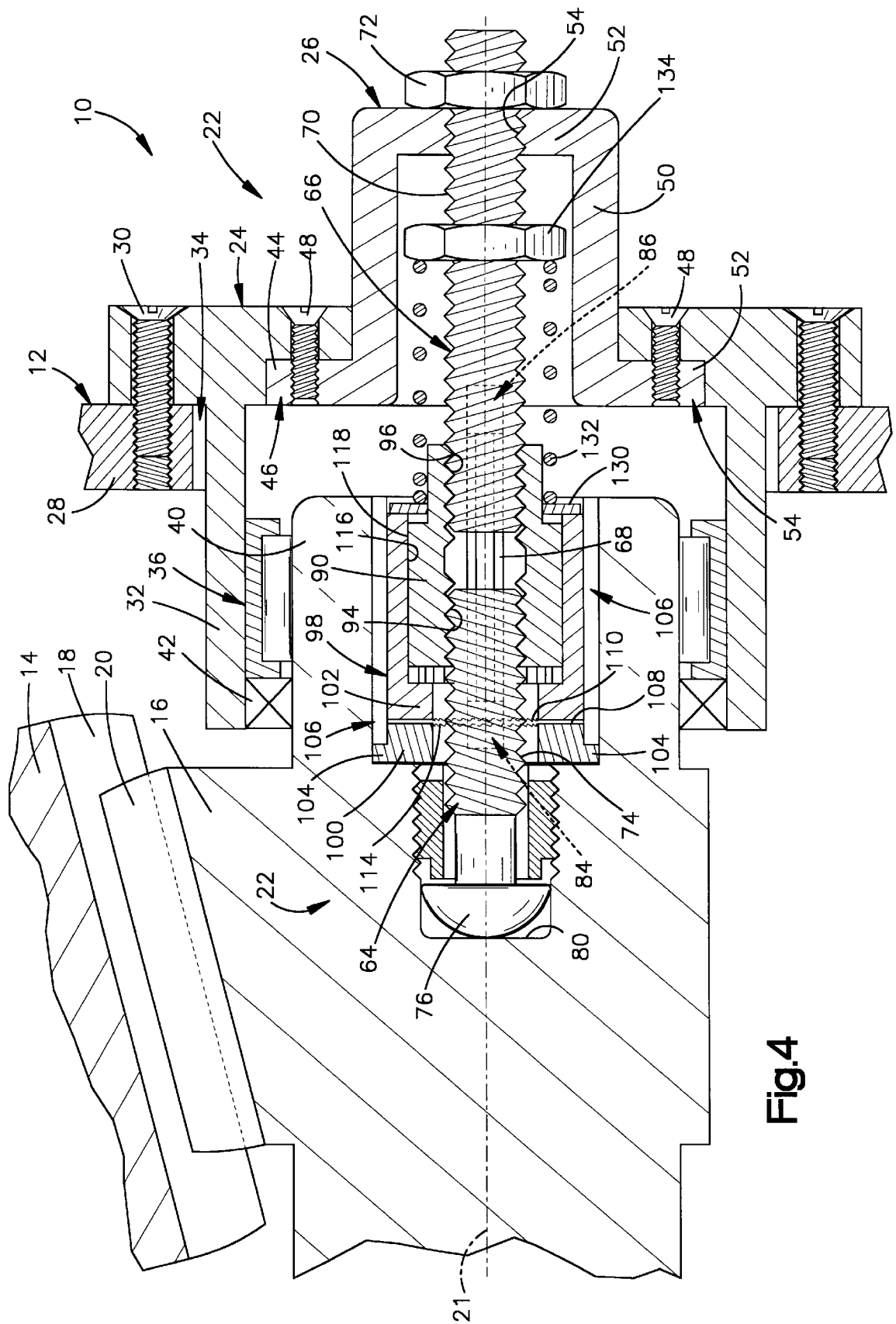
FIG. 4 is a sectional view similar to FIG. 1 showing parts in different positions.

As shown in FIG. 3, the angle A is low enough for the teeth 110 to slide against the teeth 114 in the freewheel direction 150. This sliding movement cams the ratchet sleeve 102 (and the thrust washer 130) axially outward from the ratchet ring 100 against the bias of the preload spring 132. The ratchet sleeve 102 then slides axially outward over the coupling sleeve 90 from the position of FIG. 1 to the position of FIG. 4. Each time the crests of the teeth 110 move past the crests of the teeth 114, the preload spring 132 moves the thrust washer 130 and the ratchet sleeve 102 back inward to the positions of FIGS. 1 and 2. The ratchet sleeve 102 floats axially back and forth over the coupling sleeve 90 in this manner whenever the sector gear 16 rotates in the freewheel direction 150. Since the coupling sleeve 90 is not rotated by this action of the ratchet drive 98, the position of the first adjustment screw 64 is not affected by rotation of the sector gear 16 in the freewheel direction 150. Accordingly, the adjustment mechanism 22 does not move the sector gear 16 axially to take up lash when the sector gear 16 rotates in the freewheel direction 150.

When the sector gear 16 rotates oppositely in the adjustment direction 152, the teeth 110 on the ratchet ring 100 press against the teeth 114 on the ratchet sleeve 102 in the adjustment direction 152. The teeth 110 then interact with the teeth 114 at the angle B, which is substantially steeper than the angle A. The steeper angle B may or may not permit the teeth 110 to slide out of mesh with the teeth 114 against the bias of the preload spring 132. This depends on the amount of lash that exists between the meshing teeth 18 and 20 on the rack gear 14 (FIG. 1) and the sector gear 16.

Figure 5:
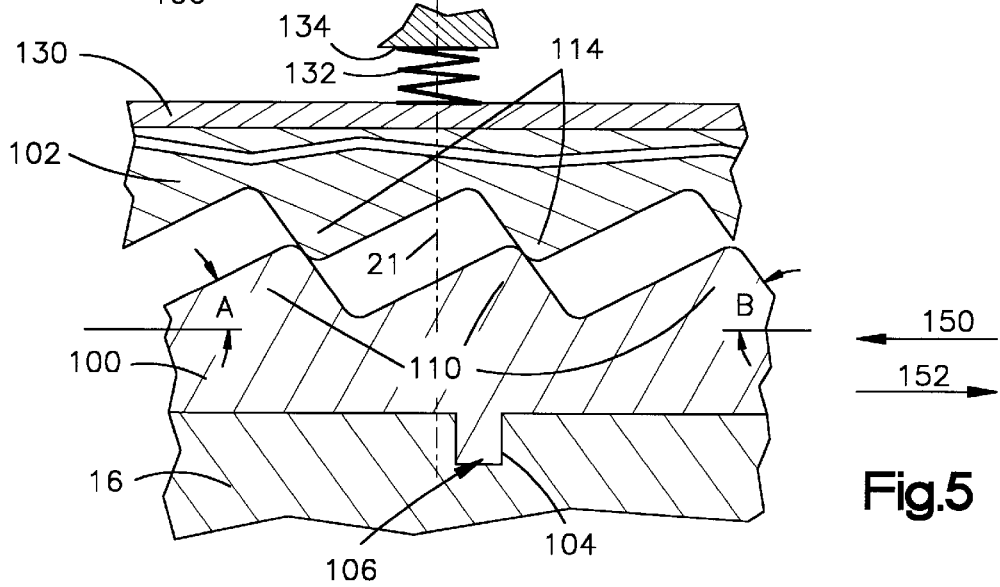
FIG. 5 also is a schematic view similar to FIG. 2 showing parts in different positions.

If the lash between the meshing gear teeth 18 and 20 is not great enough to provide clearance for movement of the sector gear 16 to the left along the axis 21, the sector gear 16 will block the first adjustment screw 64 from moving axially to the left. The first adjustment screw 64 will then block the coupling sleeve 90 from rotating in the adjustment direction. Rotation of the coupling sleeve 90 is blocked because the screw threads 74 and 94 are oriented to move the first adjustment screw 64 axially out of the coupling sleeve 90, i.e., axially to the left as viewed in FIG. 1, upon rotation of the coupling sleeve 90 in the adjustment direction 152. Since the coupling sleeve 90 and the ratchet sleeve 102 are rotationally interlocked, the ratchet sleeve 102 also is blocked from rotating in the adjustment direction 152. As shown in FIG. 5, because the ratchet sleeve 102 is blocked from rotating, the teeth 110 on the ratchet ring 100 slide against the teeth 114 on the ratchet sleeve 102 at the angle B. The sliding movement cams the ratchet sleeve 102 axially outward from the ratchet ring 100 against the bias of the preload spring 132.

On the other hand, if the lash between the meshing gear teeth 18 and 20 is great enough to provide clearance for movement of the sector gear 16 to the left along the axis 21, the sector gear 16 will not block the first adjustment screw 64 from moving axially to the left. Therefore, the first adjustment screw 64 will not block the coupling sleeve 90 and the ratchet sleeve 102 from rotating in the adjustment direction 152. Since the ratchet sleeve 102 is then rotatable in the adjustment direction, the angle B (FIG. 2) will not permit the teeth 110 on the ratchet ring 100 to cam the ratchet sleeve 102 axially away from the ratchet ring 100 against the bias of the preload spring 132. Instead, the angle B is steep enough to cause the teeth 110 to remain in mesh with the teeth 114 and to rotate the ratchet sleeve 102 in the adjustment direction 152. The coupling sleeve 90 then rotates with the ratchet sleeve 102 in the adjustment direction 152. This causes the first adjustment screw 64 to move axially against the sector gear 16 so as to push the sector gear 16 to the left along the axis 21 until the clearance between the meshing gear teeth 18 and 20 is taken up by such movement of the sector gear 16.

In accordance with a particular feature of the present invention, the first adjustment screw 64, the coupling sleeve 90, and the second adjustment screw 66 are arranged in series axially between the sector gear 16 and the housing 12. Those three parts exclusively bear the axial loads transmitted between the sector gear 16 and the housing 12. This ensures that the ratchet drive 98 is isolated from axial loads so that the ratchet teeth 110 and 114 are pressed together only by the preloading force of the spring 132.

From the above description of the invention, those skilled in the art will perceive improvements, changes and modifications. Such improvements, changes and modifications within the skill the of the art are intended to be covered by the appended claims.

Having described the invention, the following is claimed:

1. A vehicle steering apparatus comprising:

a first gear which is rotatable about an axis;

a second gear having gear teeth in meshing engagement with gear teeth on said first gear; and adjustment means for moving said first gear in one direction along said axis to reduce clearance between said meshing gear teeth, said adjustment means including:

a first threaded member movable along said axis in said one direction to move said first gear along said axis in said one direction;

a second threaded member screwed together with said first threaded member, rotation of said second threaded member causing axial movement of said first threaded member; and a ratchet drive interposed between said first gear and said second threaded member for rotating said second threaded member selectively when lash between said meshing gear teeth provides said clearance.

2. An apparatus as set forth in claim 1 wherein said ratchet drive comprises a fixed ratchet member keyed for rotation with said first gear and a floating ratchet member for, when rotated, rotating said second threaded member, said fixed ratchet member and said floating ratchet member having meshing ratchet teeth, and a spring biasing said meshing ratchet teeth into meshing engagement when said clearance exists to cause rotation of said second threaded member and axial movement of said first threaded member, said floating ratchet member moving against said spring bias and not rotating said second threaded member when said clearance does not exist.

3. An apparatus as set forth in claim 2 further including:

a housing for said first gear, said second gear and said adjustment means; and means for bearing axial loads between said first gear and said housing exclusively of said ratchet drive, said axial load bearing means including said second threaded member, a third threaded member having threads opposite the threads of said first threaded member, and a jam nut attaching said third threaded member to said housing, said second threaded member having oppositely threaded portions screwed together with said first threaded member and screwed together with said third threaded member, respectively.

4. An apparatus as set forth in claim 3 further including rotary blocking means for blocking rotation of said first threaded member, said rotary blocking means comprising a member fixed for rotation with said first threaded member and fixed for rotation with said threaded third member which is fixed to said housing.

5. A vehicle steering apparatus comprising:

a first gear which is rotatable about an axis and movable along said axis;

a second gear having gear teeth in meshing engagement with gear teeth on said first gear;

a first threaded member which is movable axially against said first gear so as to move said first gear along said axis relative to said second gear;

a second threaded member which is screwed together with said first threaded member to move said first threaded member axially against said first gear upon rotation of said second threaded member; and a ratchet drive interposed between said first gear and said second threaded member to rotate said second threaded member upon rotation of said first gear when lash between said meshing gear teeth provides clearance for said movement of said first gear along said axis relative to said second gear.

6. Apparatus as defined in claim 5 further comprising a housing containing said first gear, said first and second threaded members being included in a plurality of parts which together bear axial loads between said first gear and said housing exclusively of said ratchet drive.

7. Apparatus as defined in claim 6 wherein said first threaded member is ROTATIONALLY fixed relative to said housing.

8. Apparatus as defined in claim 7 further comprising a third threaded member which is screwed together with said second threaded member, said third threaded member being ROTATIONALLY and axially fixed relative to said housing.

* * * * *